Aug. 16, 1966      A. ROTT      3,266,328
DRIVING DEVICE FOR A SLIDING ROOF
Filed June 5, 1963      4 Sheets-Sheet 2
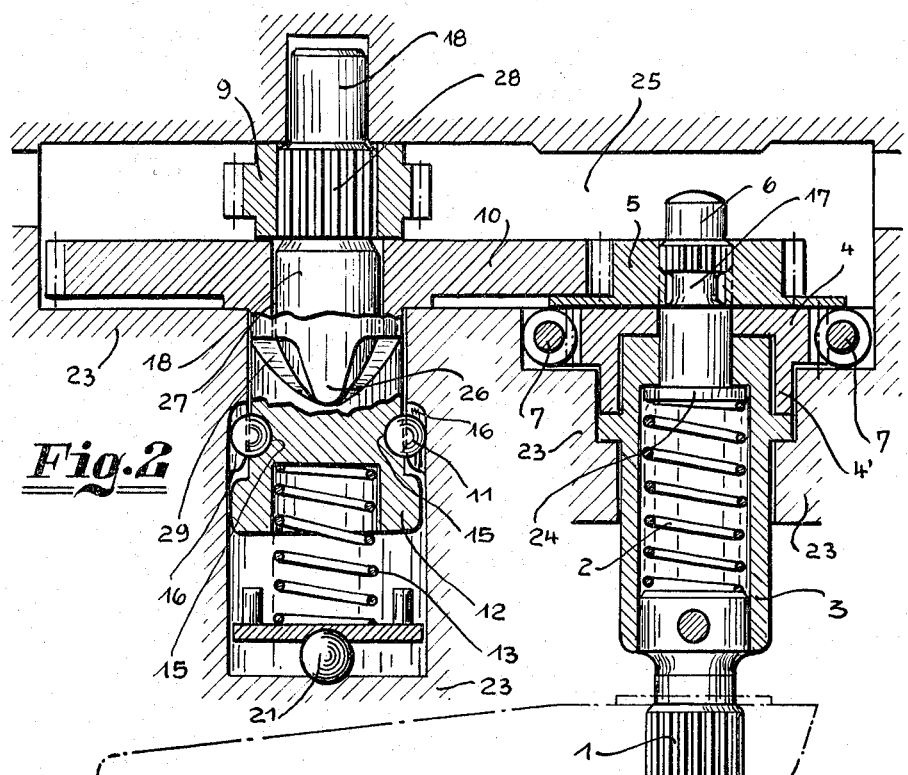
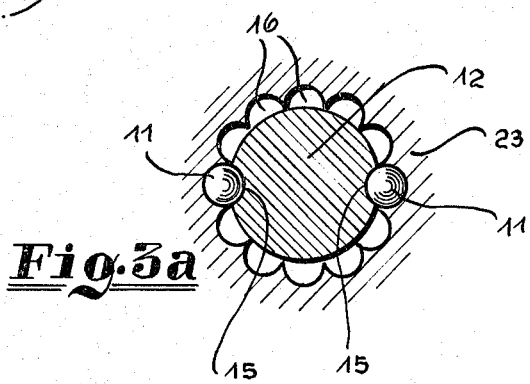

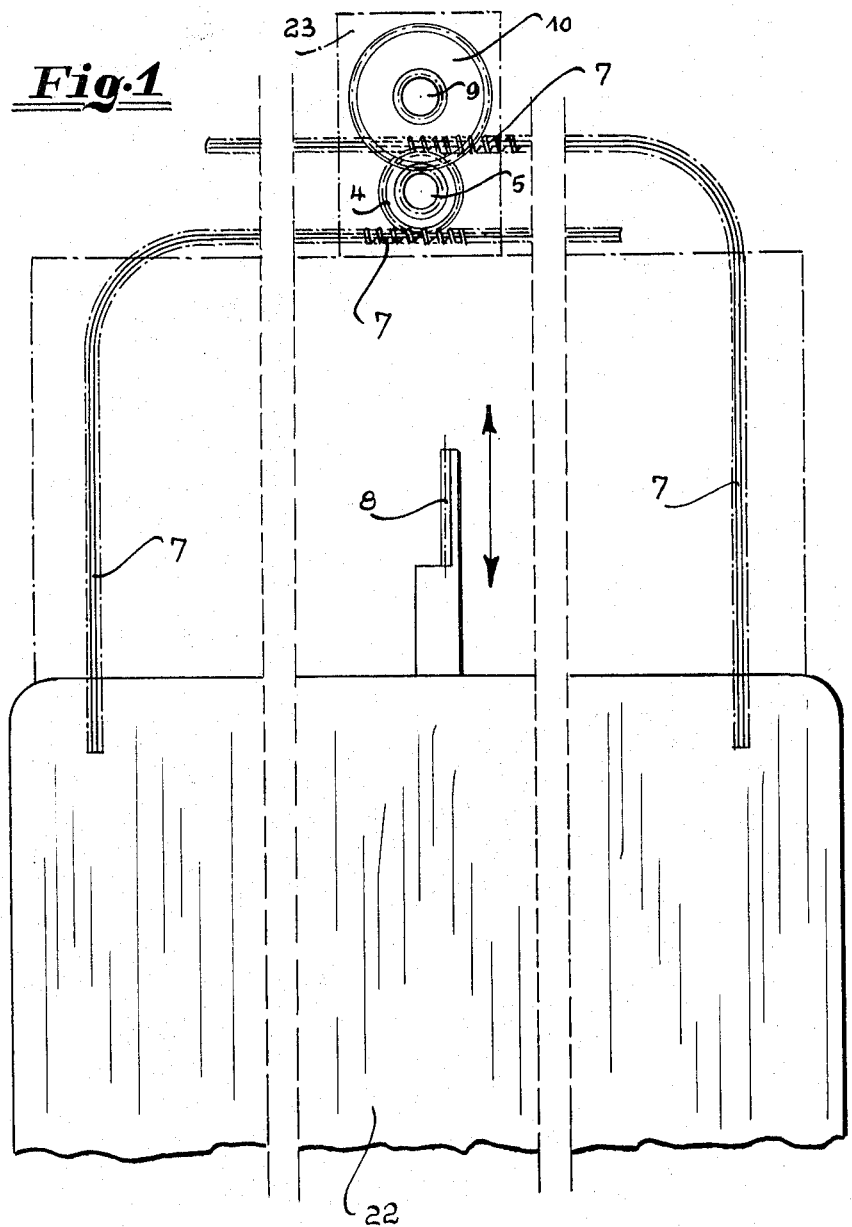

Aug. 16, 1966 A. ROTT 3,266,328
DRIVING DEVICE FOR A SLIDING ROOF
Filed June 5, 1963 4 Sheets-Sheet 4
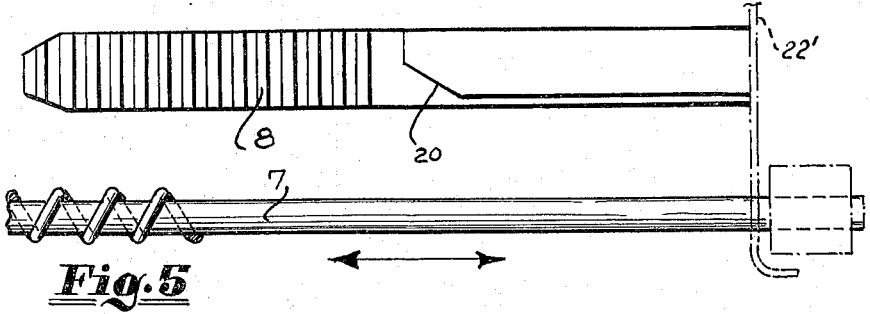
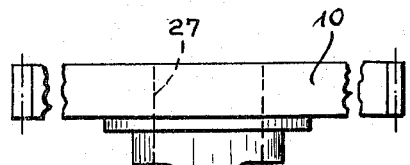
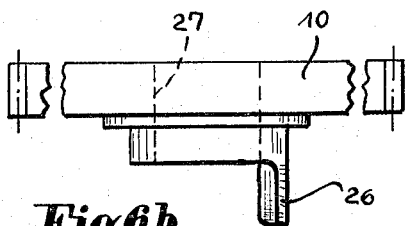
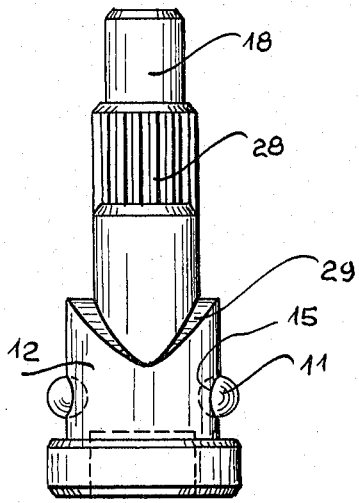
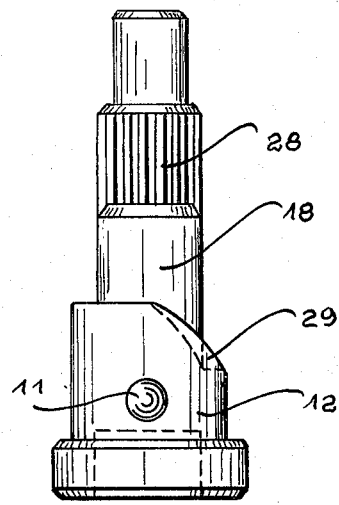

3,266,328
DRIVING DEVICE FOR A SLIDING ROOF
Anton Rott, Frankfurt am Main, Germany, assignor to H. T. Golde G.m.b.H. & Co. KG, Frankfurt am Main, Germany
Filed June 5, 1963, Ser. No. 285,779
Claims priority, application Germany June 9, 1962, G 35,177
16 Claims. (Cl. 74—89.17)

The present invention relates to driving devices for sliding or slidable roofs of motor vehicles wherein there are provided axially movable, compression and tension resisting cables for transmitting to the sliding roofs driving forces generated, for example, by hand-operated cranks or electric motors.

Associated with the above type of driving device may be a gearing, by means of which the drive of a sliding roof can be switched automatically by the cables to a locking device which moves the sliding roof at reduced speed into closing position and tightens and locks same in said closing position. Further, with said gearing may be associated a blocking device which is releasable only by way of the drive, and not by any force acting directly on the sliding roof or on the locking device, so that an opening of the roof from the outside is prevented.

There has been heretofore provided a cable drive for a sliding roof which acts on the sliding roof by way of cables which can resist tensile stress only. Shortly before the closing position is reached in this apparatus, there is an automatic switching from the cable drive to a locking device by means of which the sliding roof is moved into the closing position at reduced speed and is tightened and locked in said closing position. Also in this known arrangement, the cables are moved by a rotatable cable drum and are guided over the circumference of said drum, a small section of the circumference of the drum being developed as the rear surface of a clutch lever which, being spring-loaded, tends to leave the circumference of the drum and to interrupt or disconnect the cable drive. When, in this arrangement, the cables have almost been unwound from the drum, the clutch lever connects the cable drive. The sliding roof has then almost reached its closing position. At that moment, a hook fixed at the front of the sliding roof is in immediate proximity of a catch bolt which is moved in closing direction by an eccentric. The catch bolt grips the hook and pulls the sliding roof into the closing position in which it is latched.

The clutch is thus operated in dependence on the cable length that has been unwound. Consequently, if the cables stretch over a period of time, it may occur that the cable drum and, hence, the cable drive of the roof are released by the release of the clutch at a time at which the hook fixed to the sliding roof cannot yet be gripped by the catch or safety bolt. It may also occur, owing to shocks or other disturbances, that the cables are placed irregularly on the circumference of the drum so that the clutch lever is not disengaged at the right moment, but is too early or too late.

It is, with regard to the above, an object of the invention to make the clutching operation independent of the ropes, cables or similar members which transfer the driving motion to the sliding roof until shortly before the closing position is reached.

According to the invention, in a gearing by means of which the drive of a sliding roof can be switched, shortly before reaching the closing position, by a transmission device to a further locking device operating at reduced speed, there is provided a member for causing the switching which is directly connected, for example, rigidly or elastically, to the sliding roof so that the switching is effected in direct dependence on the position of the sliding roof itself.

Preferably, said locking device cooperates with a blocking device adapted to fix the sliding roof in the closing position or in any open position desired, said blocking device comprising, according to the invention, a rotary member on which there can be brought to act, on the part of the driving device, a torsional moment which is sufficient to overcome the blocking, but on which there can be brought to act only a lesser torsional moment of an external force acting directly on the sliding roof; and a bolt longitudinally displaceable in fixed grooves is coupled to the rotary member by a spring in such a manner that it is disengaged from the grooves depending on the angular position of the rotary member against the action of said spring and is rotated together with the rotary member. The force of the spring is so selected that a minimum torsional moment acting on the rotary member is required in order to make the rotation of the members possible. Also connected to the bolt is another rotary member, by way of which the locking device acting directly on the sliding roof can be operated.

Preferably, a cam connected to the first rotary member is opposite an inclined guide surface of a bolt which is pressed against the cam by the spring. Balls positioned in the wall of the bolt are preferably used for longitudinally guiding the bolt in the grooves.

The first rotary member is preferably the wheel of a reduction gear which can be operated by the driving device of the sliding roof with a sufficiently great torsional moment to overcome the elastic force, while the wind forces or the like acting directly on the sliding roof are able to transmit to the cables or ropes only a smaller torsional moment which cannot release the blocking.

The other rotary member which is connected to the bolt may be a gear of the locking device, which engages, shortly before the sliding roof reaches the closing position, a rack fixed on said sliding roof, in order to pull the sliding roof into the front end position and to lock it in this position.

The connection of the axially movable bolt with the other rotary member or gear may be effected by way of an external toothing which is rigidly connected to the bolt, engages a toothed bore of the rotary member and is longitudinally displaceable in said bore.

An embodiment of the present invention will now be explained in detail by way of the accompanying drawings, in which:

FIGURE 1 is a diagrammatic top view of a driving device according to the invention with the sliding roof in open position;

FIGURE 2 shows a longitudinal section through the gearing of the driving device according to FIG. 1 in neutral position, in which the blocking device is operative;

FIGURE 3 shows the blocking device according to FIG. 2 in inoperative position while the drive is operated;

FIGURE 3a is a section taken along line A—A of FIG. 3;

FIGURES 6a and 6d show individual members of the blocking device of FIGS. 2 to 4.

Figure 4:
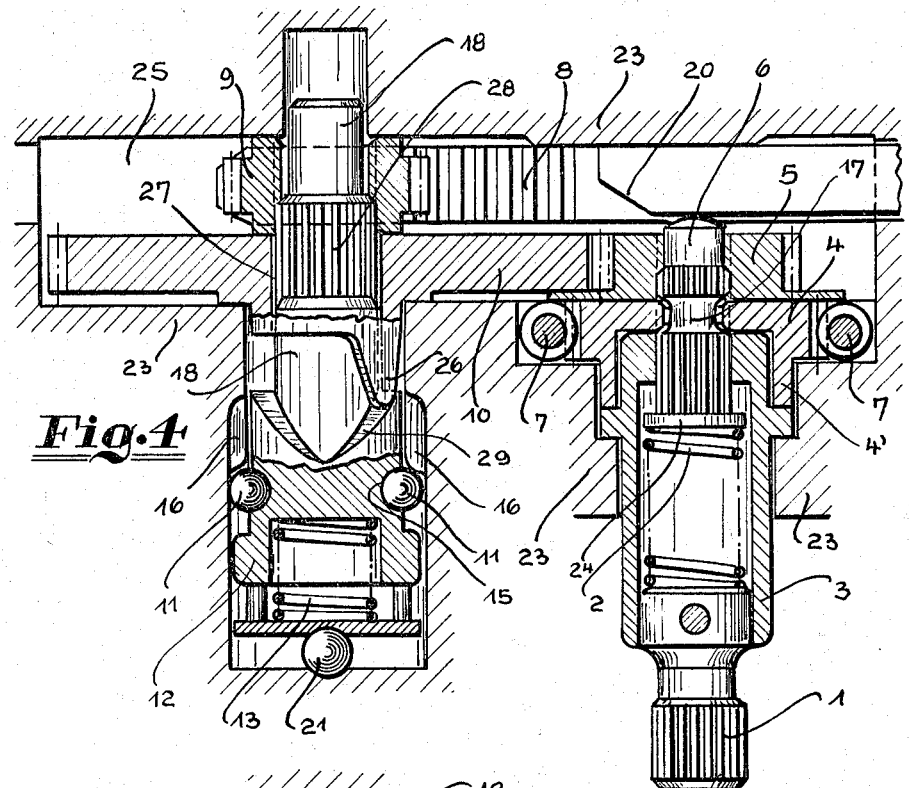
FIGURE 4 is a section similar to the one shown in FIG. 2, but during the operation of the latching device, after the driving connection to the sliding roof has been disconnected shortly before the closing position of the sliding roof is reached.

In the drawing, FIG. 1 shows a sliding roof 22 of a motor vehicle which can be pulled from the open position (shown in the drawing) along guide rails provided laterally of the roof opening on the vehicle (indicated by a dash-and-dot line) into a closing or closed position. Cables 7 capable of being subjected to compression load and tension load are used for this purpose.

Figure 5:
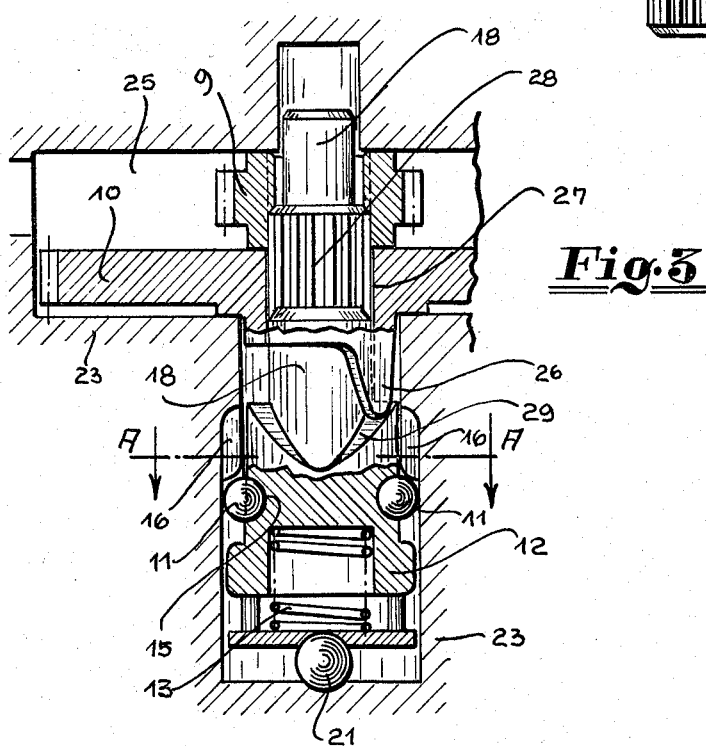
FIGURE 5 is a longitudinal section through the front transverse brace or strut of the sliding roof of FIG. 1 showing members of the driving transmission and of the locking device.

As is seen in FIG. 5, each of these cables consists of a cable core about which a wire is wound helically. The wire forms a unit with the cylindrical core. Its windings are at a uniform distance from each other, said distance being so selected that the teeth of a gear 4 (FIG. 2) engage between the windings and convey the cable 7 during rotary motion of the gear 4.

As is seen in FIG. 1, it is preferable to use two cables 7, each of which engages by means of one of its ends the sliding roof 22, while the other ends are guided past and on both sides of the gear 4 and mesh with the same.

The gear 4 is provided with an annular attachment 4' (FIG. 2) which is housed inside a circular recess of gearbox 23 on the fixed vehicle roof and is supported by a spring housing 3. The spring housing 3 has at the bottom a slip-on pin 1 constituting input means onto which a hand-operated crank can be slipped for rotating the gear 4 and, hence, for moving the cable 7, or to which another drive, for example, an electric motor (not shown) can be connected.

A common shaft in the form of a splined pin 6 passes through the gear 4 and a superjacent gear 5 and establishes, by means of teeth, a driving connection between the spring housing 3 and the gears 4 and 5. The teeth are interrupted at an annular zone 17 so that the driving connection of the gear 4 with the pin 6 is interrupted when the pin 6 is axially displaced in downward direction by a predetermined amount.

At its lower end, the pin 6 has a flange 24 which is inside the spring box 3 and is pressed upwardly by a compression spring 2 for establishing the driving connection with the gear 4 (FIG. 2). When in its inoperative position, the pin 6 projects with its upper end into a channel or passageway 25 of the gear box 23.

As will be noted from a comparison of FIG. 2 with FIG. 4, a rack 8, which is mounted on the front transverse brace 22' of the sliding roof, is introduced into the channel 25 when the sliding roof 22 approaches its closing position. Developed on said rack 8 is a guide surface 20 (FIG. 5) which, as is apparent from FIG. 4, comes into engagement with the upper end of the pin 6 shortly before the closing position is reached and presses the pin 6 downwardly to such an extent that the gear 4 is disengaged from the drive of the slip-on pin 1.

The gear 5 engages another gear 10 of larger diameter which is also rotatably positioned in a recess of the gearbox 23. By way of a blocking device and of a splined pin 18 axially displaceable through the center opening of the gear 10, said gear 10 is drivingly connected to another gear 9, so that same rotates during each motion of the slip-on pin 1. The gear 9 is so positioned that it engages the teeth of the rack 8 fixed on the sliding roof shortly before the sliding roof 22 reaches the closing position.

The length of the rack 8 corresponds approximately to the distance between the two pins 18 and 6 so that, at the moment at which the gear 9 grips the free end of the rack 8, the pin 6 is pressed downwardly by the guide surface 20 against the tension of the spring 2 and the gear 4 is thereby disconnected from its driving connection with the pin 6, i.e., it is no longer driven. From this moment on, the sliding roof 22 is moved by way of the slip-on pin 1, the gear 5, 10 and 9, and the rack 8 into the final closing position. Owing to the reduction ratio between the gears 5 and 10, this motion takes place more slowly than in the case of the normal drive by way of the gear 4 and the cables 7.

Connected to the gear 10 is a blocking device which prevents an unintentional motion of the sliding roof 22 both in the closed state and in a wholly or partially opened state of the roof, for example, owing to shocks, air current, wind resistance, etc. On its underside, the gear 10 is rotatably positioned, by means of a hub or boss, in a cylindrical bore in the gearbox 23, said hub carrying a downwardly projecting cam 26 which rotates with said gear about the axis of rotation thereof.

Also housed in said cylindrical bore is a bolt 12 which is developed in one piece with the pin 18. Two balls 11, each within a recess or opening 15, are positioned on the circumference of the bolt 12 and guide said bolt 12 longitudinally in the grooves 16 (FIG. 3a), but prevent it from rotating. The bolt 12 is continually pressed, with its control surface 29, against the cam 26 of the gear 10 by a spring 13.

Said control surface 29 is inclined obliquely upwardly, so that the bolt 12 is pressed downwardly by a determinable distance against the tension of the spring 13 in response to the angular position of the gear 10. When the gear 10 reaches the angular position indicated in FIG. 3, the cam 26 has pressed the control surface 29 downwardly to such an extent that the balls 11 leave the grooves 16 at the bottom, thereby releasing the blocking of the bolt 12 so that the same is rotatable.

The bolt 12 is rotatably positioned on a ball 21. As soon as the balls 11 leave the grooves 16, the bolt 12 is driven in the direction of rotation by the cam 26. Rotated together with the bolt 12 is the pin 18 which passes freely through a center opening 27 of the gear 10 and grips the gear 9 by way of a cooperating connection 28, so that the gear 9 is also rotated with the bolt 12. Since the bolt 12 is axially displaceable, the connection 28 between the pin 18 and the gear 9 is developed as toothing, on the one hand, on the outer surface of the pin 18, and on the other hand, in the center bore of the gear 9, which permits of axial displacement of the pin 18 with respect to the gear 9 while preventing relative rotation therebetween.

When the gear 10 is caused to rotate by the drive which acts on the slip-on pin 1, the cam 26 rides up the control surface 19 to an extent whereat the bolt 12 reaches a position in which the balls 11 leave the grooves 16 and thereby make possible a rotation of the bolt 12 and, hence, of the gear 9 which either runs idly when the sliding roof is open or pulls the sliding roof 22 by way of the rack 8 shortly before the closing position is reached. As soon as the drive is interrupted, the spring 13 alone is operative and pushes the bolt 12 upwardly, in which case the cam 26 with the gear 10 is able to give way since no driving moment then acts on the gear 10.

Upon the upward motion of the bolt 12, the balls 11 again engage the grooves 16, so that any further rotation of the gear 9 is prevented by the blocking of the bolt and the sliding roof is blocked in its final closing position or else, in any open position desired.

When the sliding roof 22 has been opened to a greater or lesser degree, the gear 10 is retained or held in position by the blocking device 12, 26, even when the driving motion by way of the gear 4 and the cables 7 stops, and the gear 10, in turn, blocks by way of the intermediate gear 5 the pin 6 and thereby the gear 4. When the gear 4 is fixed, it is impossible to move the cables 7 so that the sliding roof 22 is in fixed position. A force acting directly on the sliding roof 22 will as a rule not exert a sufficient torsional moment on the gear 10 to press the control surface 29 and thereby the bolt 12 downwardly by way of the cam 26. Appropriate proportioning of the spring 13 will thus prevent a rotation of the gear 10 and a displacement of the sliding roof 22 if a force produced by an air current or by hand acts on the sliding roof 22 itself.

FIGS. 2 to 4 show different angular positions of the gear 10 and, hence, different heights of the bolt 12. FIG. 2 shows the position of the blocking device according to the invention, in which a rotation of the gear 10 is not possible, unless a minimum torsional moment applied from the side of the drive acts on the gear 10. In FIG. 3, the gear 10 is rotated by the driving device, whereby the balls 11 leave their grooves 16 and the bolt 12 is set in rotary motion.

FIGS. 6a to 6d show the cam 26 connected to the gear 10 and the control surface 29 arranged on the bolt 12, which are pressed upon each other under the pressure of the spring 13. The pin 18 forms one piece with the bolt 12.

The blocking device operates in such a manner that it is released by the driving device any time the driving device exerts a strong torsional moment. When the driving force slackens, the blocking device blocks any motion if an external force acts on the sliding roof, which is transmitted to the bolt 12 either by way of the rack 8 or by way of the cables 7 and the gearing. A torsional moment exerted rearwardly of the sliding roof by way of the cables on the blocking device is normally not sufficient to bring about a deblocking, such as will be brought about readily by the strong driving device. The differences between the torsional moments can be increased in that the cables 7 act with a shorter lever arm than the drive 1 on the gearing, for example, by way of the pin 6.

What is claimed is:

1. Apparatus comprising a displaceable element, first and second means connected to said element to enable displacement of the latter, first drive means in continuous engagement with the first means, second drive means adapted to engage the second means with the displaceable element moved to a predetermined position, input means, and transmission means normally coupling said source to at least said first drive means, said transmission means being responsive to movement of said element to said position to isolate said first drive means from said input means and couple said second drive means to said input means.

2. Apparatus as claimed in claim 1 wherein said displacement element is a slidable roof.

3. Apparatus as claimed in claim 2 wherein said first and second means are respectively a cable and a rack coupled to said roof.

4. Apparatus as claimed in claim 1 wherein said second drive means comprises a reduction gear train.

5. Apparatus as claimed in claim 1 wherein said drive means comprises coaxial gears with internal and external teeth and said transmission means comprises a splined pin extending displaceably through said gears and adapted for coupling and selectively isolating the gears to and from said input means.

6. Apparatus as claimed in claim 5 comprising a spring axially engaging said pin and urging the same to a position relative to said gears whereat the pin couples both said gears to said input means.

7. Apparatus as claimed in claim 6 comprising a cam on said displaceable element to displace said pin against said spring, when the displaceable element moves to said predetermined position, to a position whereat said first drive means is decoupled from said input means.

8. Apparatus as claimed in claim 7 wherein the transmission means further comprises a housing coaxially aligned with said gears and enclosing said spring and through which extends said splined pin in driving engagement therewith, said input means comprising means on the housing for the application of manual and automatic driving forces thereto.

9. Apparatus as claimed in claim 1 wherein said second drive means comprises a blocking means permitting actuation of the second drive means exclusively by said transmission means and power source.

10. Apparatus as claimed in claim 1 wherein said second drive means comprises coaxial gears with exterior and interior teeth, the exterior teeth of one of said gears engaging said second means, the other of said gears being driven via the exterior teeth thereof by said transmission means, and a splined pin selectively coupling and decoupling said gears through the intermediary of the interior teeth thereof.

11. Apparatus as claimed in claim 10 comprising means supporting said splined pin for axial movement between first and second positions in the first of which said gears are decoupled and means operatively associated with said pin to prevent rotation thereof in said first position.

12. Apparatus as claimed in claim 11 wherein the latter said means comprises balls journalled in said pin and protruding radially therefrom, and a support housing said pin and defining axial slots receiving said balls and limiting displacement thereof for a determinable displacement of said pin.

13. Apparatus as claimed in claim 11 comprising cooperating cam elements respectively affixed to said other gear and said pin and providing for axial displacement of said pin from said first to said second position upon rotation of said other gear.

14. Apparatus as claimed in claim 13 wherein the cam element on said other gear is an axially extending member and the cam element on the first said pin provides a cam surface for cooperation with the extending member.

15. Apparatus as claimed in claim 14 comprising a spring acting axially against the splined pin to urge the same to said first position.

16. Apparatus as claimed in claim 13 comprising a further gear interposed between said other gear and said transmission means.

References Cited by the Examiner

UNITED STATES PATENTS

| | | | |
|---|---|---|---|
| 2,833,537 | 5/1958 | Hauck | 74—501 X |
| 2,985,483 | 5/1961 | Bishop et al. | 74—501 X |
| 3,154,962 | 11/1964 | Mukherjee | 74—337 |

FRED C. MATTERN, Jr., *Primary Examiner.*

BROUGHTON G. DURHAM, *Examiner.*

F. E. BAKER, *Assistant Examiner.*